United States Patent
Natvig et al.

(10) Patent No.: US 12,417,289 B2
(45) Date of Patent: Sep. 16, 2025

(54) SYSTEMS AND METHODS FOR DETECTING MALWARE IN OBFUSCATED SCRIPTS

(71) Applicant: Acronis International GmbH, Schaffhausen (CH)

(72) Inventors: Kurt Natvig, Thatcham (GB); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 168 days.

(21) Appl. No.: 18/462,646

(22) Filed: Sep. 7, 2023

(65) Prior Publication Data

US 2025/0086281 A1     Mar. 13, 2025

(51) Int. Cl.
*G06F 21/56*     (2013.01)
*G06F 21/00*     (2013.01)

(52) U.S. Cl.
CPC .......... *G06F 21/568* (2013.01); *G06F 21/566* (2013.01)

(58) Field of Classification Search
CPC ...... G06F 21/568; G06F 21/566; G06F 21/50; G06F 21/55; G06F 21/56; G06F 21/561; G06F 21/562; G06F 21/563; G06F 21/577
See application file for complete search history.

(56) References Cited

U.S. PATENT DOCUMENTS

2011/0197177 A1* 8/2011 Mony ................. G06F 8/51
                                                        717/115

* cited by examiner

*Primary Examiner* — Edward Zee
(74) *Attorney, Agent, or Firm* — ArentFox Schiff LLP; Michael Fainberg

(57) ABSTRACT

Disclosed herein are systems and method for detecting malware in obfuscated scripts. A method may include receiving the obfuscated script on a computing device written in a first coding language, wherein a malware scanner on the computing device is incompatible with the first coding language, identifying the first coding language based on detected keywords and operators in the obfuscated script, converting each line of the obfuscated script in the first coding language into a respective modified abstract syntax tree (mAST), receiving artifacts of the obfuscated script by executing at least one mAST using a universal emulator, scanning the artifacts for malware using the malware scanner; and in response to detecting the malware in the obfuscated script based on the scanning, performing a remediation action on the obfuscated script.

18 Claims, 20 Drawing Sheets

| Func (exec p1, params p2..pn) | Sub (p1-p2) | Add (p1+p2) | Mul (p1*p2) | Div (p1/p2) | MoreThan (p1>p2) |
| --- | --- | --- | --- | --- | --- |
| LessThan (p1<p2) | NotEqual (p1!=p2) | LessOrEqual (p1<=p2) | Concat (p1+p2) | Int (int p1) | Str (str p1) |
| Bool (bool p1) | Name (id p1) | Not (!p1) | And (p1 && p2) * | Or (p1 \|\| p2) * | Base (resolve p1.p2) |
| Mod (p1 % p2) | Xor (p1 ^ p2) | Pow (p1$^{p2}$) | ParamName | IntDiv (int p1/d2) | MoreOrEqual (p1 >= p2) |
| Increment (p1++) | Decrement (p1--) | IsEqual (p1==p2) | Assign (p1=p2) | AssignConcat (p1 += p2) | Double (double p1) |
| | | | None | | |

SYSTEMS AND METHODS FOR DETECTING MALWARE IN OBFUSCATED SCRIPTS

FIELD OF TECHNOLOGY

The present disclosure relates to the field of data security, and, more specifically, to systems and methods for detecting malware in obfuscated scripts.

BACKGROUND

Malware written as scripts are often highly obfuscated. For the naked eye or for machines, it can be difficult to understand what the script will do upon execution. There are multiple languages available to malware authors. Accordingly, they can use one language to accomplish one malicious action and another language for a different malicious action. Because each language requires its own emulator with a module to analyze the content of a script, and because conventional anti-malware systems need to interpret each language by itself, malware detection can be a huge undertaking in terms of memory usage and processing. On any given computing device (e.g., a computer) running such anti-malware systems, this high memory usage and processing chips away at the resources available for user-generated activities (e.g., applications that the user interacts with directly). There thus exists a need to improve the efficiency and reliability of malware detection in computer technology without utilizing a substantive amount of computational resources.

SUMMARY

Aspects of the disclosure relate to the field of data security. In particular, aspects of the disclosure describe methods and systems for detecting malware in obfuscated scripts.

In one exemplary aspect, the techniques described herein relate to a method for detecting malware in an obfuscated script, the method including: receiving the obfuscated script on a computing device written in a first coding language, wherein a malware scanner on the computing device is incompatible with the first coding language; identifying the first coding language based on detected keywords and operators in the obfuscated script; converting each line of the obfuscated script in the first coding language into a respective modified abstract syntax tree (mAST); receiving artifacts of the obfuscated script by executing at least one mAST using a universal emulator; scanning the artifacts for malware using the malware scanner; and in response to detecting the malware in the obfuscated script based on the scanning, performing a remediation action on the obfuscated script.

In some aspects, the techniques described herein relate to a method, wherein the converting further includes performing tokenization, multi-line rewrites, and token rewrites.

In some aspects, the techniques described herein relate to a method, wherein the converting further includes mapping flows in the obfuscated script.

In some aspects, the techniques described herein relate to a method, wherein the remediation action includes one of quarantining the obfuscated script and/or the artifacts, removing the obfuscated script and/or the artifacts from the computing device, and performing a recovery process on the computing device.

In some aspects, the techniques described herein relate to a method, wherein the artifacts include another script written in a second coding language incompatible with the malware scanner, further including: identifying the second coding language based on detected keywords and operators in the another script; converting each line of the another script in the second coding language into another respective mAST; receiving additional artifacts of the another script by executing at least one of the another respective mAST using the universal emulator; scanning the additional artifacts for malware using the malware scanner; and in response to detecting the malware in the another script based on the scanning, performing the remediation action on the another script.

In some aspects, the techniques described herein relate to a method, wherein the universal emulator is configured to execute an operation of the at least one mAST to generate a given artifact, and wherein the malware scanner is configured to scan the given artifact.

It should be noted that the methods described above may be implemented in a system comprising a hardware processor. Alternatively, the methods may be implemented using computer executable instructions of a non-transitory computer readable medium.

In some aspects, the techniques described herein relate to a system for detecting malware in an obfuscated script, including: at least one memory; at least one hardware processor coupled with the at least one memory and configured, individually or in combination, to: receive the obfuscated script on a computing device written in a first coding language, wherein a malware scanner on the computing device is incompatible with the first coding language; identify the first coding language based on detected keywords and operators in the obfuscated script; convert each line of the obfuscated script in the first coding language into a respective modified abstract syntax tree (mAST); receive artifacts of the obfuscated script by executing at least one mAST using a universal emulator; scan the artifacts for malware using the malware scanner; and in response to detecting the malware in the obfuscated script based on the scanning, perform a remediation action on the obfuscated script.

In some aspects, the techniques described herein relate to a non-transitory computer readable medium storing thereon computer executable instructions for detecting malware in an obfuscated script, including instructions for: receiving the obfuscated script on a computing device written in a first coding language, wherein a malware scanner on the computing device is incompatible with the first coding language; identifying the first coding language based on detected keywords and operators in the obfuscated script; converting each line of the obfuscated script in the first coding language into a respective modified abstract syntax tree (mAST); receiving artifacts of the obfuscated script by executing at least one mAST using a universal emulator; scanning the artifacts for malware using the malware scanner; and in response to detecting the malware in the obfuscated script based on the scanning, performing a remediation action on the obfuscated script.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2 is a block diagram illustrating a plurality of emulator handlers.

DETAILED DESCRIPTION

Figure 1:
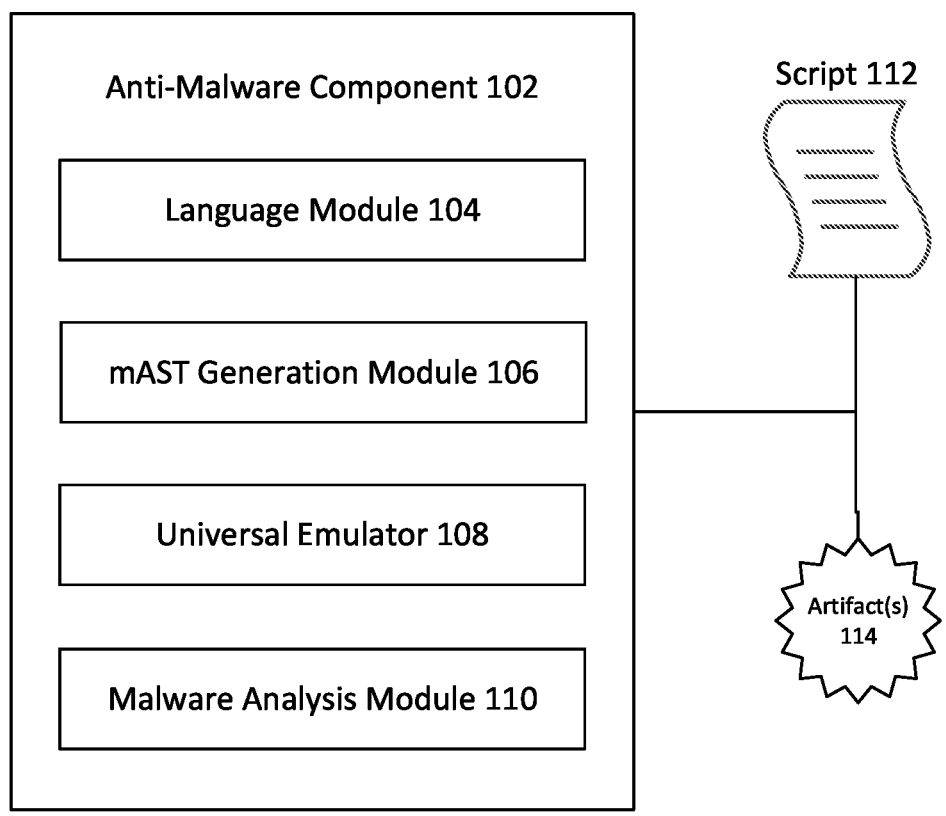
FIG. 1 is a block diagram illustrating a system for detecting malware in obfuscated scripts.

Exemplary aspects are described herein in the context of a system, method, and computer program product for detecting malware in obfuscated scripts. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Emulation is a tool/technique every anti-malware vendor uses to understand what happens behind obfuscated and/or encrypted malware objects without letting the malware run for real. For example, emulators may be used for x86/x64 binary code. This is different than scripts as the Intel opcodes are coming in defined opcodes in the right logical sequences (done by a compiler or a human). In the past, specific emulators were written for very obscure targets—like old WordMacro and even Flash. Emulators specific to a language take a lot of time and effort to research, develop, and maintain.

In its most basic form, an emulator is a piece of software that mimics real execution. For instance, an emulator can mimic "cscript.exe" to "run" a visual basic script (VBS), WinWord.exe to "run" Word VBA macros, Excel.exe to "run" Excel VBA and XLM macros, a browser to "run" Javascripts, a PHP installation to "run" PHP malware etc. The most important element is that emulation does not involve actually running the program and is just a simulation.

If one breaks down an emulator, one will discover that an emulator needs to emulate a lot of operations. Such operations may include, but are not limited to, adding two numbers together (operation ADD), subtracting two numbers from each other (operation SUB), assigning a value to something (operation ASSIGN), multiplying two numbers together (operation MUL), implementing binary AND between two integer numbers or logical AND between two other data-structures (operation AND), checking if one number is larger or equal to the other (operation_LargerOrEqual), resolving a base class with a member (operation BASE), emulating a runtime function or a class function (operation FUNC), etc. When code is broken down into the logical units associated with such operations, an emulator may be used.

In accordance with the present disclosure, a compiler is divided into three parts: (1) front-end for parsing source code for a target (formal language support), (2) middle-end for generating a modified abstract syntax tree (mAST) from the input of the front-end, and (3) back-end for generating the target code (e.g., the object code). The compiler may utilize a mAST to make a tree representation of the abstract syntactic structure (structural or content-related details) of source-code written in a formal language. Basically, compilers produce a logical tree-map of nodes of the operations and relations needed to parse the formal language as code. The root node is the top where the logic starts. A node is just an object that includes a few properties: (1) a parent (who to send the result back to once the wanted operation is done), (2) a child, typically a left and a right node—but it can also be more if needed, and (3) a specific operation to perform. If data is needed, the operation will get them from child-nodes parsing left to right.

In general, the front-end is responsible for parsing and understanding the source-code to a certain level. The front-end understands the language and will process the data according to the rules of the language while potentially making several passes over the source-code if needed. The middle-end will try to use the data from the front-end to build logical trees (e.g., mAST). The middle-end may try to optimize these trees as well. The back-end will use the logical trees (e.g., mAST) and generate the target code. For example, the back-end may read the mAST and produce a binary executable with the same logic as the script used for input.

FIG. 1 is a block diagram illustrating system 100 for detecting malware in obfuscated scripts. System 100 includes anti-malware component 102 which determines whether script 112 is malicious (e.g., includes malware). In some aspects, anti-malware component 102 may be a part of an anti-virus software solution. In some aspects, anti-malware component 102 may be installed on computer system 20 (described in FIG. 4). For example, computer system 20 may be a desktop computer. In some aspects, anti-malware component 102 may be split into a thin client application and a thick client application. For example, the thin client application may be installed on a desktop computer and performs tasks such as transmitting an input script to the thick client application installed on a remote server, which performs processor-heavy tasks such as analyzing the input script and generating a report indicating whether the script is safe or malicious. The thick client application may transmit the report to the thin client application, which may subsequently output the report for display.

Anti-malware component 102 includes language module 104, mAST generation module 106, universal emulator 108, and malware analysis module 110.

Consider an example of a C compiler that reads C source files, produces object code, and links them. In a conventional system, executables associated with the C compiler may be moved to a sandbox to analyze their behavior. This approach, however, is both time consuming and expensive especially inline in a product. Furthermore, if the same C compiler is given a Visual Basic script, the compiler will output an error indicating incompatibility.

The present disclosure overcomes these shortcomings by detecting the original language that script 112 is written in using language module 104, converting the script 112 from its original form in the original language to a universal form using mAST generation module 106, and executing, via universal emulator 108, the converted script in an isolated environment to reveal its true nature.

In an exemplary aspect, malware analysis module 110 receives a log of the script execution, identifies the produced artifact(s) 114 (e.g., files written to storage), and generates a de-obfuscated version of the script for scanning. In some aspects, anti-malware component 102 may be compatible with a plurality of programming languages. In some cases, a script written in one language may produce a file or script in a different language. Anti-malware component 102 is configured to detect the languages (e.g., Visual Basic Script (VBS), Visual Basic for Applications (VBA), PHP, JavaScript, AutoIt, Batch, Excel Formula 4.0 code, etc.) of the artifacts and convert them into a universal language (e.g., mAST) as well.

In the present disclosure, anti-malware component 102 compiles supported programming languages into mAST, which is a custom version of object code, and executes the code in a universal emulator 108 to analyze script 112 behavior and artifact(s) 114. The compilation is performed directly, quickly, and securely with no need for sandbox solutions running on large virtual infrastructures. This makes anti-malware component 102 lighter than conventional anti-malware systems and makes it easier to integrate directly into a product such as a static-file scanner that analyzes scripts and VBA macros. For example, anti-malware component 102 may be incorporated in a scanner used for web hosting content inspection, where anti-malware component 102 may analyze PHP scripts to assess for maliciousness.

Conventional anti-malware systems typically send an obfuscated malware script to a sandbox solution where the script waits in a queue for the sandbox solution to be ready for the sample. Conventional anti-malware systems may reimage a virtual machine in preparation for script execution, run the script, gather information, and return data back to a caller. In a sandbox the code runs and performs actions inside a virtual machine. This is a time consuming job involving waiting in a queue, reimaging, launching, waiting for completion, extracting results, etc. Sandboxes are off-box solutions, which means that they need to be shipped to another computer for the analysis. In the present disclosure, the emulator is emulating the code—not running it. Emulation can be performed quickly, securely, and occurs on the same device with no wait time.

In contrast, the conversion and analysis of anti-malware component 102 may assess for maliciousness in a fraction of the time it takes for a sandbox solution and inline in a solution. There is also no need to execute the malicious script in accordance with the systems and methods of the present disclosure. The anti-malware component 102 has support for all language's malware use and support for all runtime API/structures used in such languages.

Language module 104 is configured to detect and load code from script 112, specify keywords, operators, etc., perform tokenization and multi-line rewrites, map flows, perform token rewrites, and provide Application Programming Interface (API) support and class support.

mAST generation module 106 is configured to identify a starting point in the code, divide equations into left and right branches, determine operator priority, generate nodes, and identify node type.

Universal emulator 108 is configured to execute functions, execute an mAST node, identify constants, local and global variables, and interact with language API support, and log activities. FIG. 2 is a block diagram illustrating a plurality of emulator handlers associated with universal emulator 108. In some aspects, the handlers include, but are not limited to, "func(exec p1, params p2 . . . pn)," "Add (p1+p2)," "Mul(p1*p2)," . . . "None."

Malware analysis module 110 is configured to analyze deobfuscated code, identify dropped files, and generate a report indicative of malicious (if any). It should be noted that the dropped files, the deobfuscated source, and the report are artifact(s) 114.

On a more technical level, language module 104 is a first component that is language dependent. Language module 104 detects the language to emulate and is configured to:
  a. Specify the keywords and operators for the language.
  b. Map the language operators into an emulator operator map. For example,
    i. '+' means operator ADD
    ii. '.=' means operator ASSIGN_CONCAT for PHP
    iii. '+=' means operator ASSIGN_ADD for PHP/ Javascript
    iv. See table 1 for other emulator handlers
  c. Load the code from an object (file/stream). For example, language module 104 needs to find embedded content (if any).
  d. Find real code first pass to: extend lines, break lines and/or remove garbage, honor defines.

e. Tokenize each logical line into tokens.
f. Map the language logical flow (if, else if, else, endif), do/while, etc.
g. Support token rewrite for the language.
h. Provide the API support and global variables the language expects.
i. Define what guest APIs are interesting for our logging use.
j. Provide class-support for the language (e.g. VBS needs the WSCRIPT class).

mAST generation module 106 is configured to convert the language into a tree by:
a. Finding the root node, as previously discussed (start of logical operation)
b. Creating the tree based on this root node (split whole equation on prioritized operators into left and right child-nodes).
c. Allocating each node with its corresponding data if not an operation. For example, the data may be:
   i. Name (identifier like 'I')
   ii. Integer (number like −5)
   iii. Double (a double value like 1.2)
   iv. Boolean (a boolean value true or false)
   v. String (a string like "hello")
   vi. Class (a class reference like WSCRIPT)
   vii. Array
d. Optimizing the tree. Here, for simple operators like add, sub, div and mul-mAST generation module 106 checks if the child-nodes are atomic nodes with no children. If so, module 106 performs the operation first, and changes the original node back to an atomic node with the new calculated number.

Universal emulator 108 is configured to:
a. Build the global scope, meaning find subroutines/functions and their parameters
b. Execute a given subroutine by
   i. Handling parameters and return-codes
   ii. Executing the mAST nodes for each line
c. Manage constants, local and global variables
d. Interact with the language module 104's API support and classes
e. Log activity (for deobfuscated script or complete log).

When emulation is complete, malware analysis module 110 gathers intelligence from the emulation. In some aspects, malware analysis module 110 may perform a check for malware after each emulation of given operation in the mAST corresponding to a line of code. For deobfuscated code, malware analysis module 110 replaces the lines changed in runtime to provide a deobfuscated version of the malware. Malware analysis module 110 further extracts dropped files and executed scripts, and determines how to handle them. For example, if a VBS drops a PowerShell, universal emulator 108 may create another instance of itself as a PowerShell script, and run the targeted PowerShell script with the same machine-settings (registry, environment, etc.). Malware analysis module 110 may further generate a report of interesting behavior.

Table 1 is shown below and provides additional examples of operations that universal emulator 108 may handle, such as those shown in FIG. 2. Each language dependent-layer links the operators from the given language towards a generic emulator operator table. Additional data needed by the operation (node) is denoted as p1 or p2. The left node is p1 and the right node is p2. Some operators take a defined number of data-elements like a function-call. Some do not take any additional data denoted as ( )

TABLE 1

| Operation | Description |
|---|---|
| Func (name, p1..pN+1) | • Can be supplied with a base object to derive from<br>• Pops the name of the function to execute (not embedded in node)<br>• Number of parameters specified in the node itself<br>• Determine if raw mode (certain functions will pop the parameters directly, like if). If not:<br>  • Pops 0..N of the parameters into a table for the target host API to receive<br>• If function call is indeed a function:<br>  • Calls the function and returns the value received from the function<br>• If function is an array<br>  • Index into the array and return the member specified by the parameter<br>• Log if interesting. Used to build deobfuscated scripts. |
| Sub (p1−p2) | • Subtracts the values p1 − p2 and returns the value |
| Add (p1+p2) | • Adds the values p1 + p2 and returns the value |
| Mul (p1*p2) | • Multiplies the values p1 * p2 and returns the value |
| Div (p1/p2) | • Divides p1 / p2 (check for 0) and returns the double value |
| IntDiv (int p1/d2) | • Returns an integer divide of p1 / p2 (check for 0) |
| MoreThan(p1>p2) | • Returns a Boolean if value p1 more than value p2 |
| LessThan (p1<p2) | • Returns a Boolean if value p1 less than value p2 |
| MoreOrEqual (p1 >= p2) | • Returns a Boolean value of p1 more or less than p2 |
| NotEqual (p1!=p2) | • Returns a Boolean if value p1 not equal value p2 |
| LessOrEqual (p1<=p2) | • Returns a Boolean if value p1 less or equal than value p2 |
| IsEqual (p1==p2) | • Returns a Boolean value of p1 is equal to p2 |
| Concat (p1+p2) | • Adds p1 to p2, typically strings and return the concatenated value |
| Assign (p1=p2) | • Assigns the value p2 to identifier referenced as p1. Will return p2 as value as well to parent.<br>• Here you can store what really was assigned to a variable, instead of the potential garbage APIs it uses to make the code unreadable |
| AssignAdd (p1 += p2) | • If p1 exists, p1 += value of p2. If p2 doesn't exist, identifier p1 = p2. |
| AssignSub (p1 −= p2) | • If p1 exists, p1 −= value of p2. If p2 doesn't exist, identifier p1 = p2. |

TABLE 1-continued

| | |
|---|---|
| Int ( ) | • Returns the integer specified, no additional data required |
| Str ( ) | • Returns the string specified, no additional data required |
| Bool ( ) | • Returns the Boolean value specified, no additional data required |
| Name ( ) | • Returns the name specified as a identifier, no additional data required |
| Double ( ) | • Returns the double value specified, no additional data required |
| Ref ( ) | • Returns the location and value of value specified |
| Base (resolve p1.p2) | • Pops first the base class to be used<br>• Pops next the method to find within the base<br>• Resolves the method from the base and returns this new object (value) |
| Not (!p1) | • Return a Boolean value of not p1 |
| And (p1 && p2) | • If the value of p1 and p2 are integers it will return a binary and between the values<br>• If not both integers, returns a logical value (true or false) of p1 and p2 |
| Or (p1 \|\| p2) | • If the value of p1 and p2 are integers it will return a binary or between the values<br>• If not both integers, returns a logical value (true or false) of p1 or p2 |
| Mod (p1 % p2) | • Returns a value of the modulo of p1 % p2. |
| Xor (p1 ^ p2) | • Returns a value of p1 xor with the value of p2 |
| Pow (p1$^{p2}$) | • Returns a value of p1$^{p2}$ |
| Increment (p1++) | • Reads the value of p1, increase and store, and returns the original value |
| Decrement (p1−−) | • Reads the value of p1, decrease and store, and returns the original value |
| Parantece (p1) | • Returns the expression p1 with parentheses (more for disassembler as an mAST node will do the same) |
| ParamName (var p1 = p2) | • Some languages can specify parameter names with an operator, so this handler just stores the identifier of the name<br>• Pops the parameters name as p1<br>• Pops the value itself as p2 |
| Like(p1 like p2) | • Returns a value depending on p1 like p2 (e.g. VBA) |
| None ( ) | • A none-handler, used for missing parameters etc. |

FIGS. 3-6 are examples of how code in script 112 are analyzed in accordance with the systems and methods of the present disclosure.

Consider an example in which script 112 includes the following code:

```
i = 500 + 4 * counter
i = CreateObject("WScript.Shell").Exec("test.exe")
s = empty ( _server [ "HTTPS" ] ) ? " : ( _server [ "HTTPS" ] == "on" ) ? "s" : "“
```

In a conventional setting, non-compatible compiler of an anti-malware system may throw an error because it is unable to recognize the language. In the present disclosure, however, language module 104 may identify and process the code as it supports a plurality of languages. For example, if something spawns PowerShell to run a script—the new instance is interpreted as PowerShell. The same applies for other languages.

Consider the following line: i=500+4*counter

Language module 104 may perform tokenization of the line and generate: [i][=][+][4][*][counter]. In this case, there is no token re-write. mAST generation module 106 then generates mAST 300.

A mAST is a tree representation of the abstract syntactic structure (structural or content-related details) of text (often source-code) written in a formal language. The mAST may be used in a compiler to represent the structure of program code. For example, Table 2 below represents an input code, its lexical analyzer output, and the corresponding mAST.

TABLE 2

| Input Code | Lexical Output | | | mAST | |
|---|---|---|---|---|---|
| count = 1; | 1 | 1 | Identifier count | Sequence | |
| while (count < 10) { | 1 | 7 | Op_assign | Sequence | |
|   print("count is: ", count, "\n"); | 1 | 9 | Integer 1 | ; | |
|   count = count + 1; | 1 | 10 | Semicolon | Assign | |
| } | 2 | 1 | Keyword_while | Identifier | count |
| | 2 | 7 | LeftParen | Integer | 1 |
| | 2 | 8 | Identifier count | While | |
| | 2 | 14 | Op_less | Less | |
| | 2 | 16 | Integer 10 | Identifier | count |
| | 2 | 18 | RightParen | Integer | 10 |
| | 2 | 20 | LeftBrace | Sequence | |
| | 3 | 5 | Keyword_print | Sequence | |
| | 3 | 10 | LeftParen | ; | |
| | 3 | 11 | String "count is: " | Sequence | |
| | | | | Sequence | |
| | 3 | 23 | Comma | Sequence | |
| | 3 | 25 | Identifier count | ; | |
| | 3 | 30 | Comma | Prts | |
| | 3 | 32 | String "\n" | String | "count is: " |
| | 3 | 36 | RightParen | ; | |
| | 3 | 37 | Semicolon | Prti | |
| | 4 | 5 | Identifier count | Identifier | count |
| | 4 | 11 | Op_assign | ; | |
| | 4 | 13 | Identifier count | Prts | |
| | 4 | 19 | Op_add | String | "\n" |
| | 4 | 21 | Integer 1 | ; | |
| | 4 | 22 | Semicolon | Assign | |
| | 5 | 1 | RightBrace | Identifier | count |
| | 6 | 1 | End_of_input | Add | |
| | | | | Identifier | count |
| | | | | Integer | 1 |

Figure 3A:
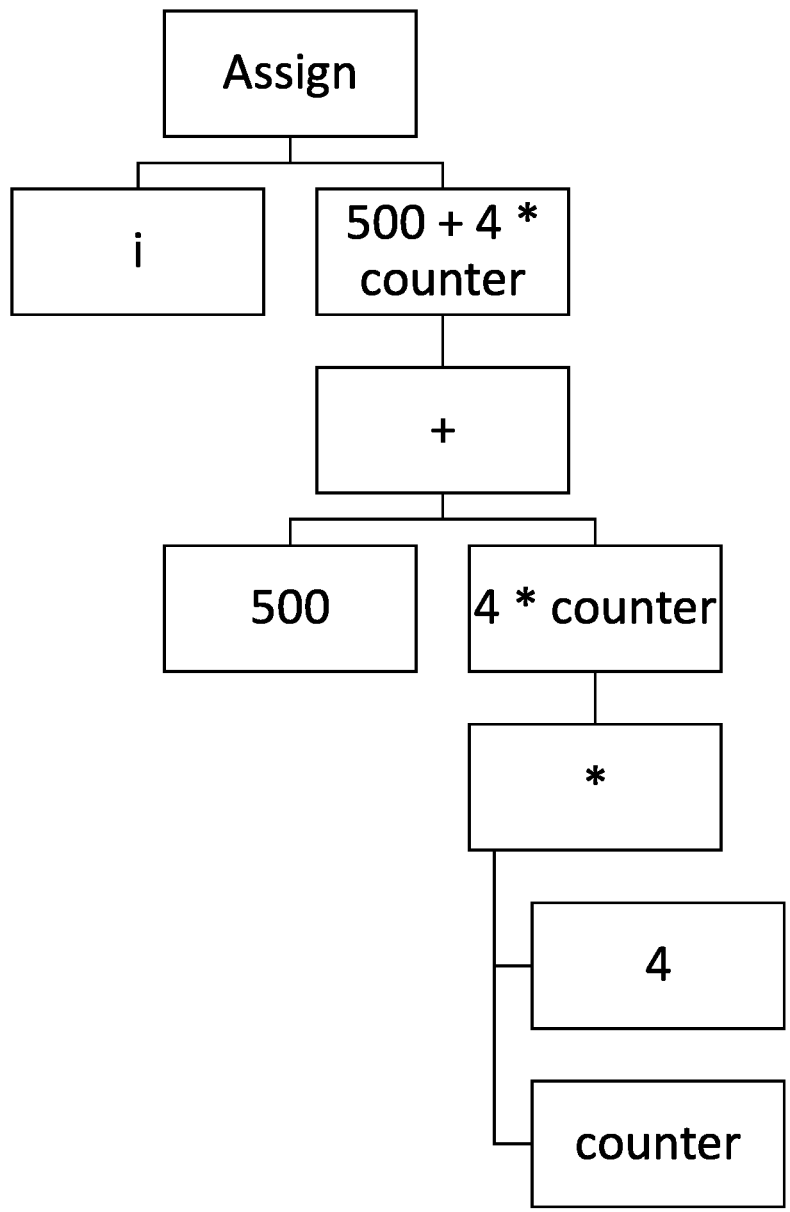
FIG. 3a is a block diagram illustrating an example of a first modified abstract syntax tree (mAST) of a first line of code.
Figure 3B:
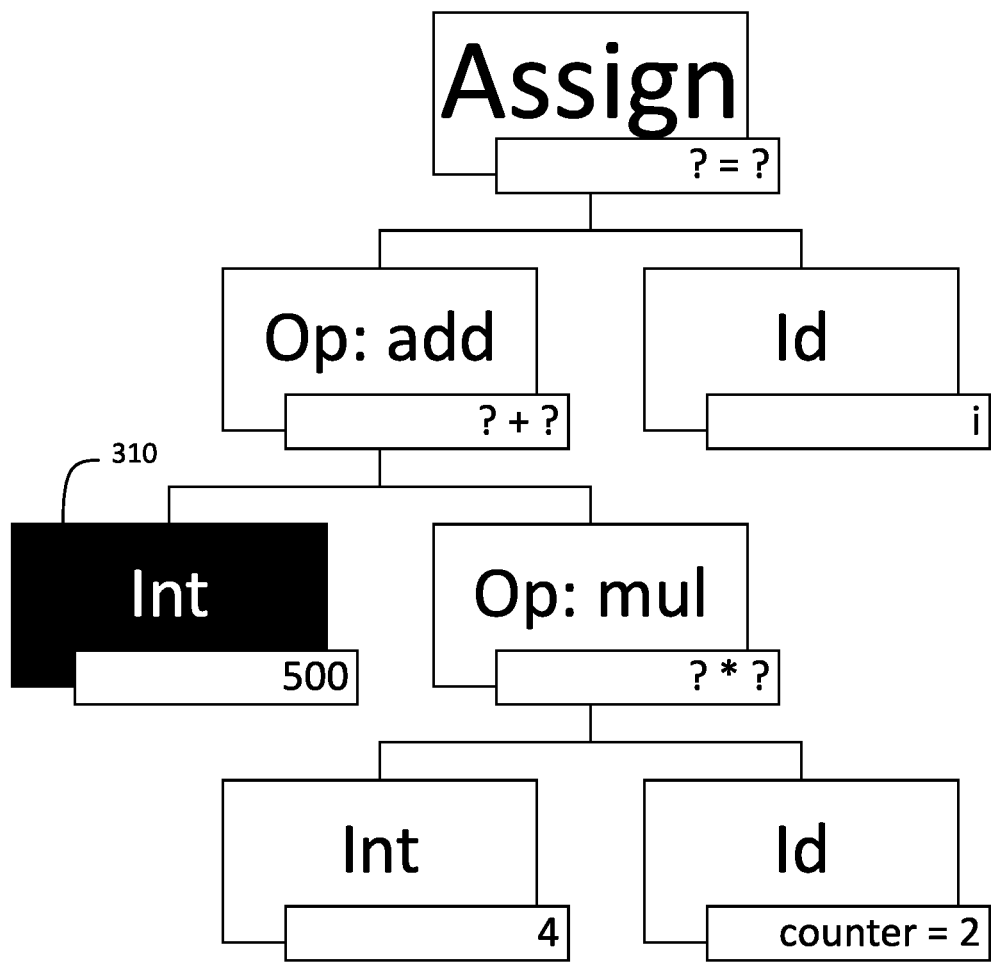
FIG. 3b is a block diagram illustrating a first step of execution of the first mAST.
Figure 3C:
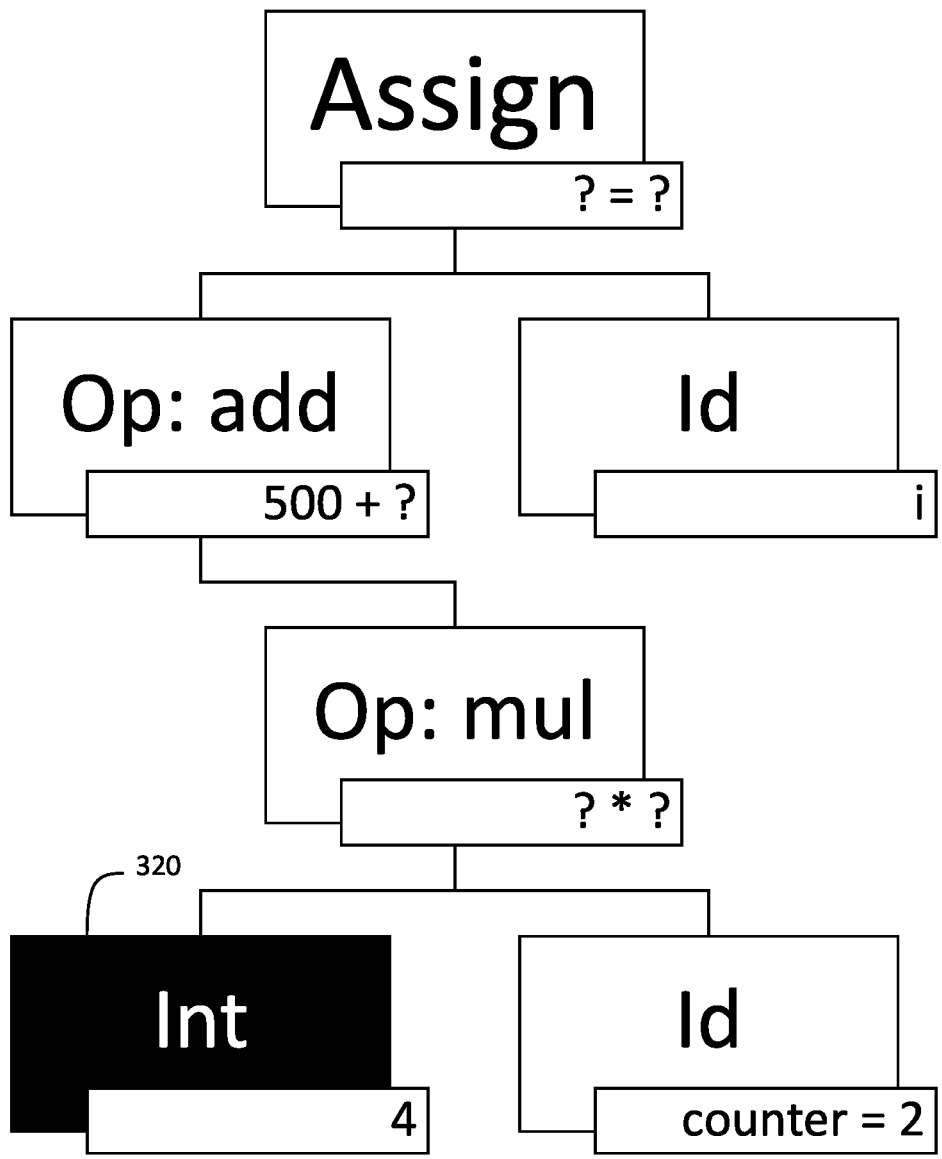
FIG. 3c is a block diagram illustrating a second step of execution of the first mAST.
Figure 3D:
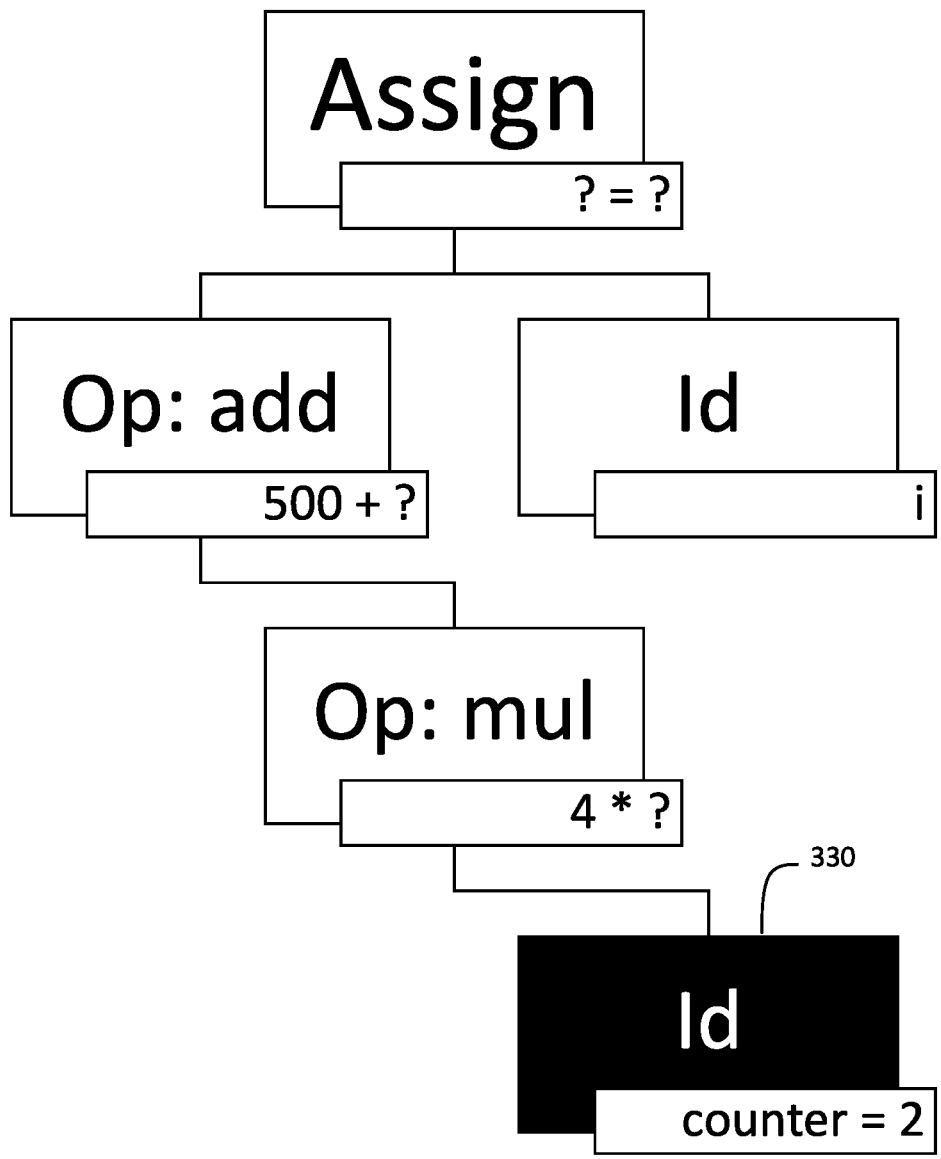
FIG. 3d is a block diagram illustrating a third step of execution of the first mAST.
Figure 3E:
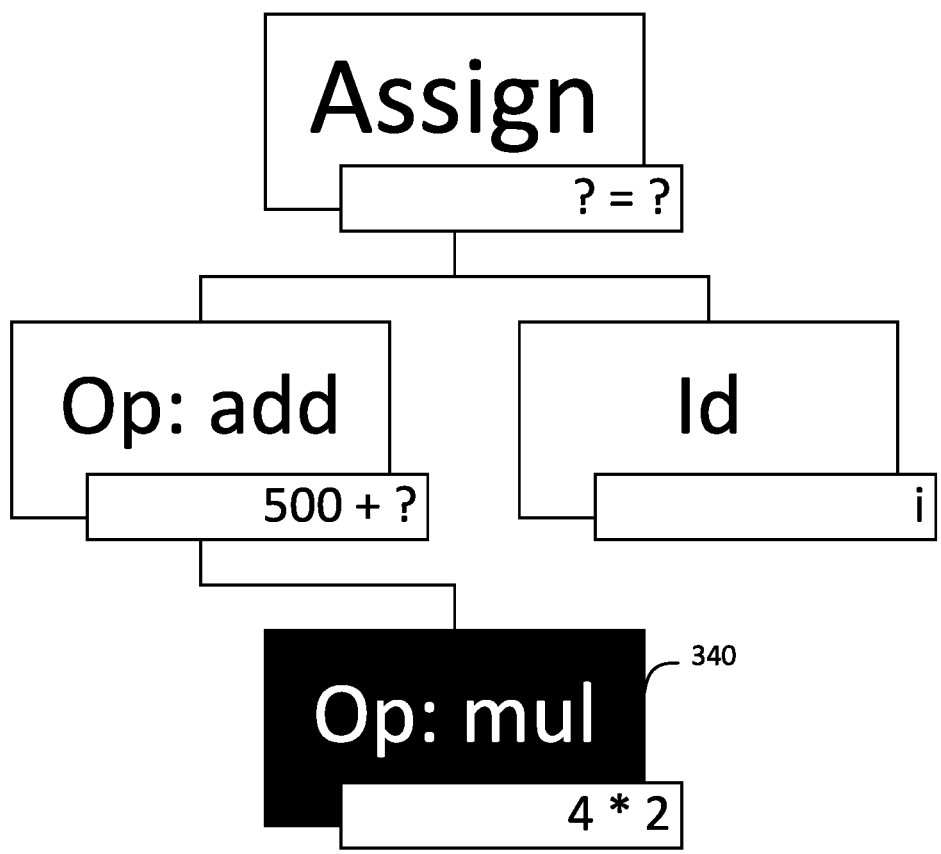
FIG. 3e is a block diagram illustrating a fourth step of execution of the first mAST.
Figure 3F:
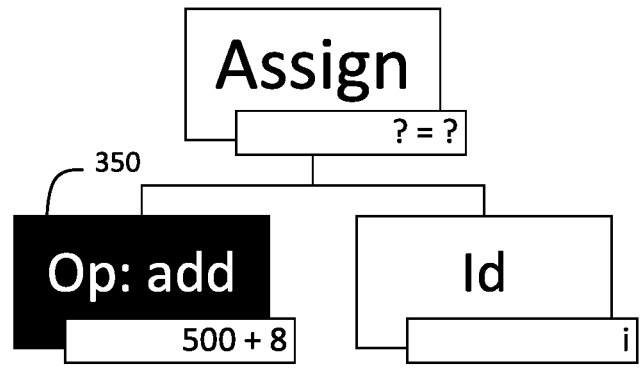
FIG. 3f is a block diagram illustrating a fifth step of execution of the first mAST.
Figure 3G:
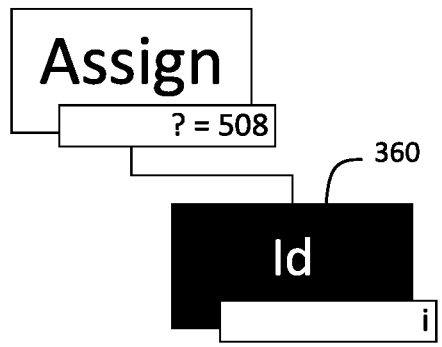
FIG. 3g is a block diagram illustrating a sixth step of execution of the first mAST.
Figure 3H:
FIG. 3h is a block diagram illustrating a seventh step of execution of the first mAST.

FIG. 3a is a block diagram illustrating an example of a first mAST 300 of a first line of code (i.e., i=500+4*counter). FIGS. 3b-3h showcase the execution of various steps in the first mAST. For example, in FIG. 3b, universal emulator 108 executes the step 310 (i.e., int 500), introducing the integer 500. In FIG. 3c, universal emulator 108 executes the step 320 (i.e., int 4), introducing the integer 4. In FIG. 3d, universal emulator 108 executes the step 330 (i.e., Id counter=2). In FIG. 3e, universal emulator 108 executes the step 340 (i.e., Op:mul, multiplication operator), which multiples the counter value of 2 by the integer 4. In FIG. 3f, universal emulator 108 executes the step 350 (i.e., Op: add, addition operator), which adds the integer 500 with the product determined in FIG. 3e (i.e., 500+8). In FIG. 3g, universal emulator 108 executes the step 360 (i.e., Id i), which introduces the variable i. In FIG. 3h, universal emulator 108 executes the step 370 (i.e., Assign), in which the sum 508 is assigned to variable i.

In general, the flow is that a function gets run one at a time. When a line of the function runs, the line's source gets converted to an mAST. Then, the line runs and universal emulator 108 will run the next line depending on the instruction pointer. If this calls another function, it will repeat itself. When the function returns, the previous function resumes. In other words, universal emulator 108 does not check anything while running; its sole focus is to generate data. Only after a certain number of lines are counted, universal emulator 108 calls the host with the current results, and the host can then determine if the results are enough or whether to keep emulating.

Figure 4A:
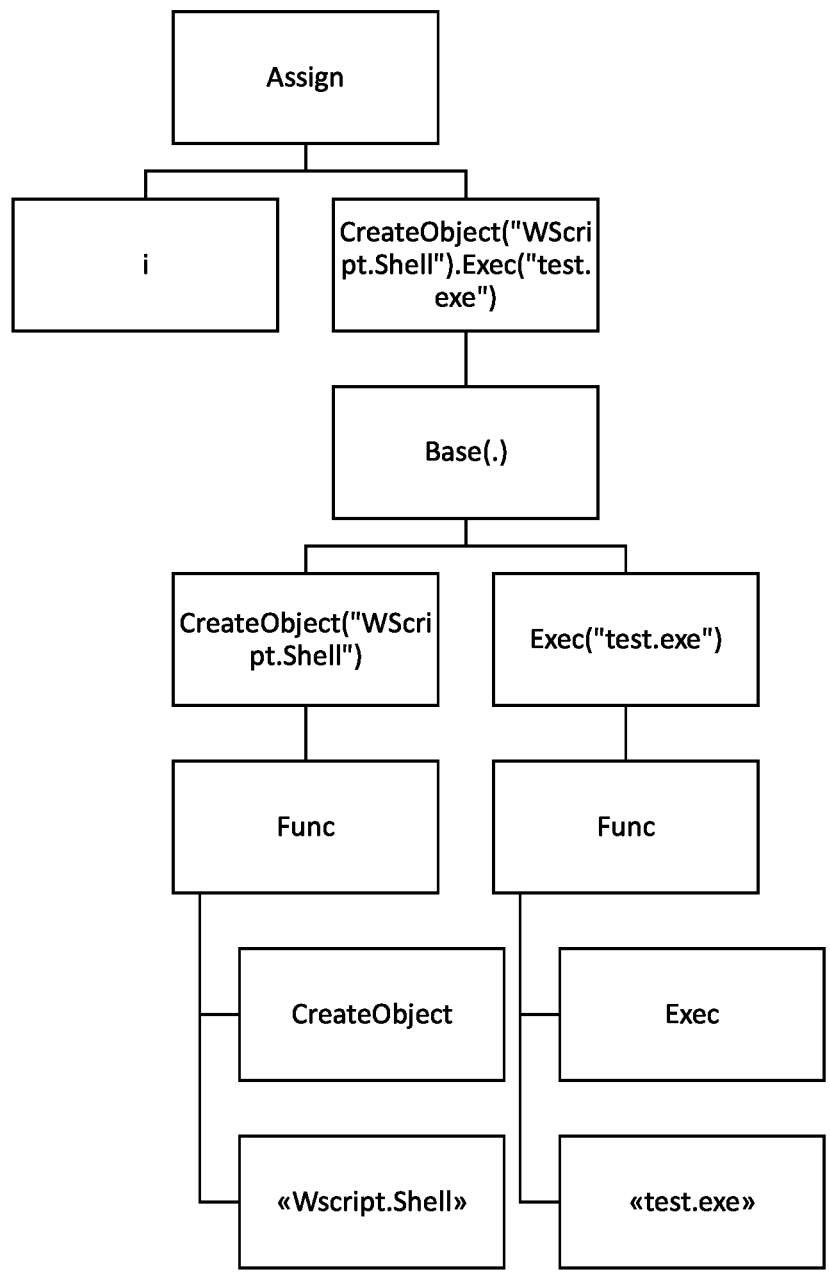
FIG. 4a is a block diagram illustrating an example of a second modified abstract syntax tree (mAST) of a second line of code.
Figure 4B:
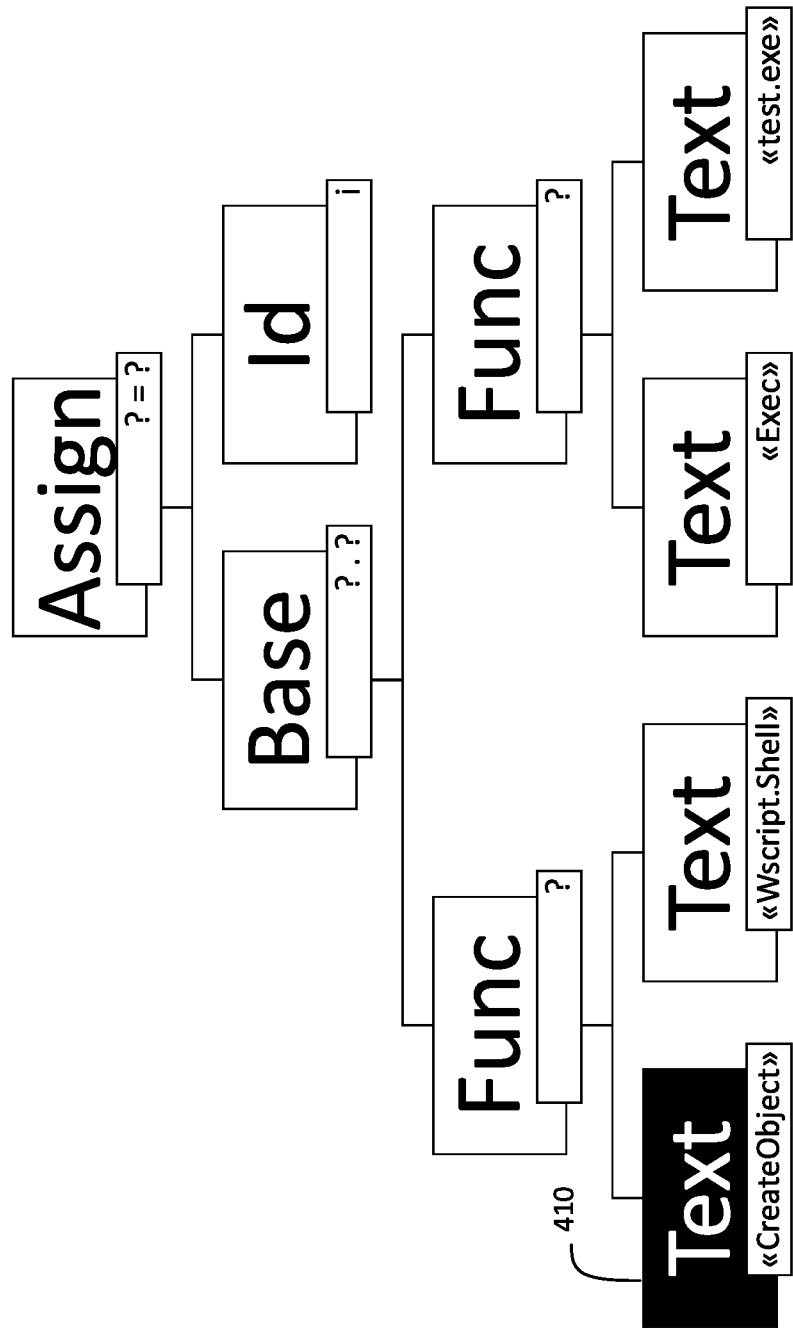
FIG. 4b is a block diagram illustrating a first step of execution of the second mAST.
Figure 4C:
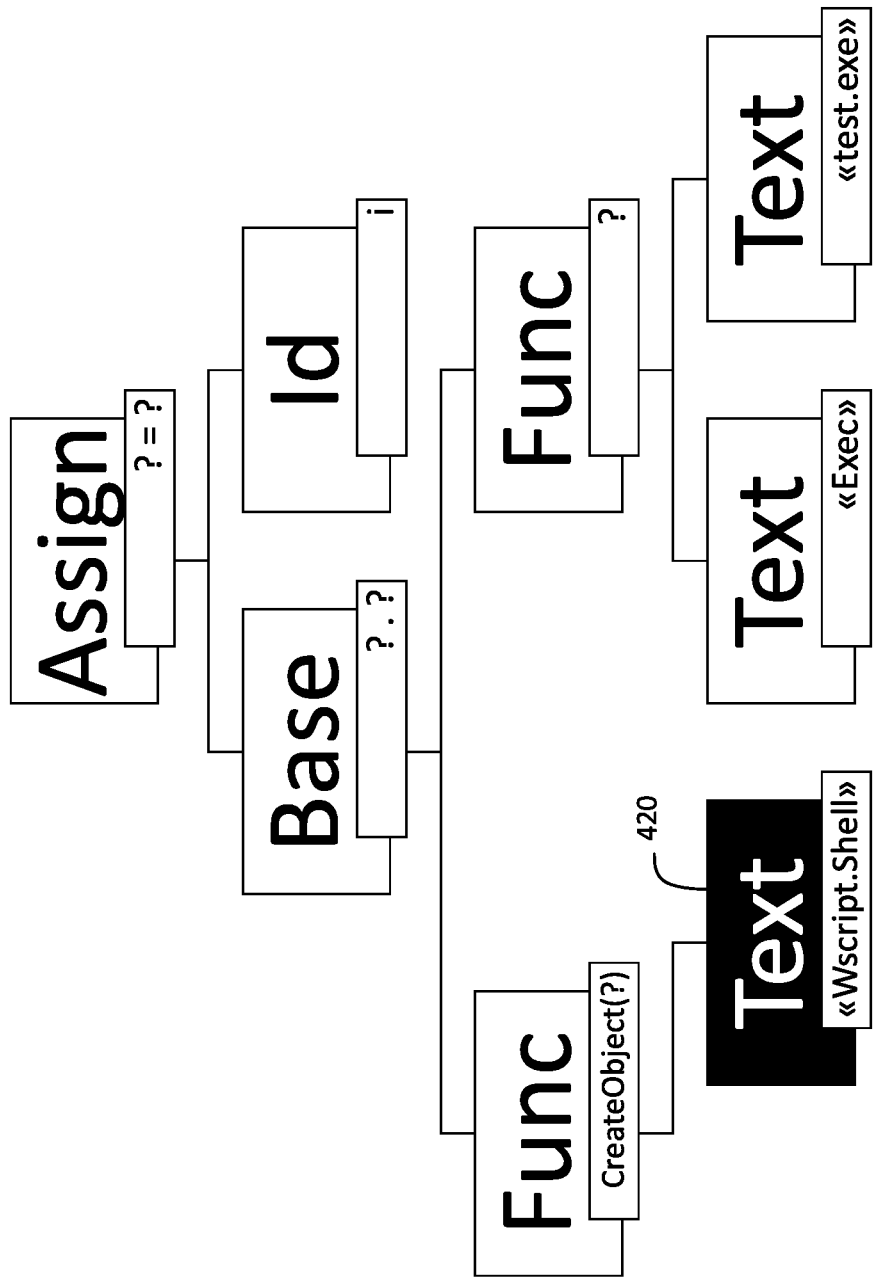
FIG. 4c is a block diagram illustrating a second step of execution of the second mAST.
Figure 4D:
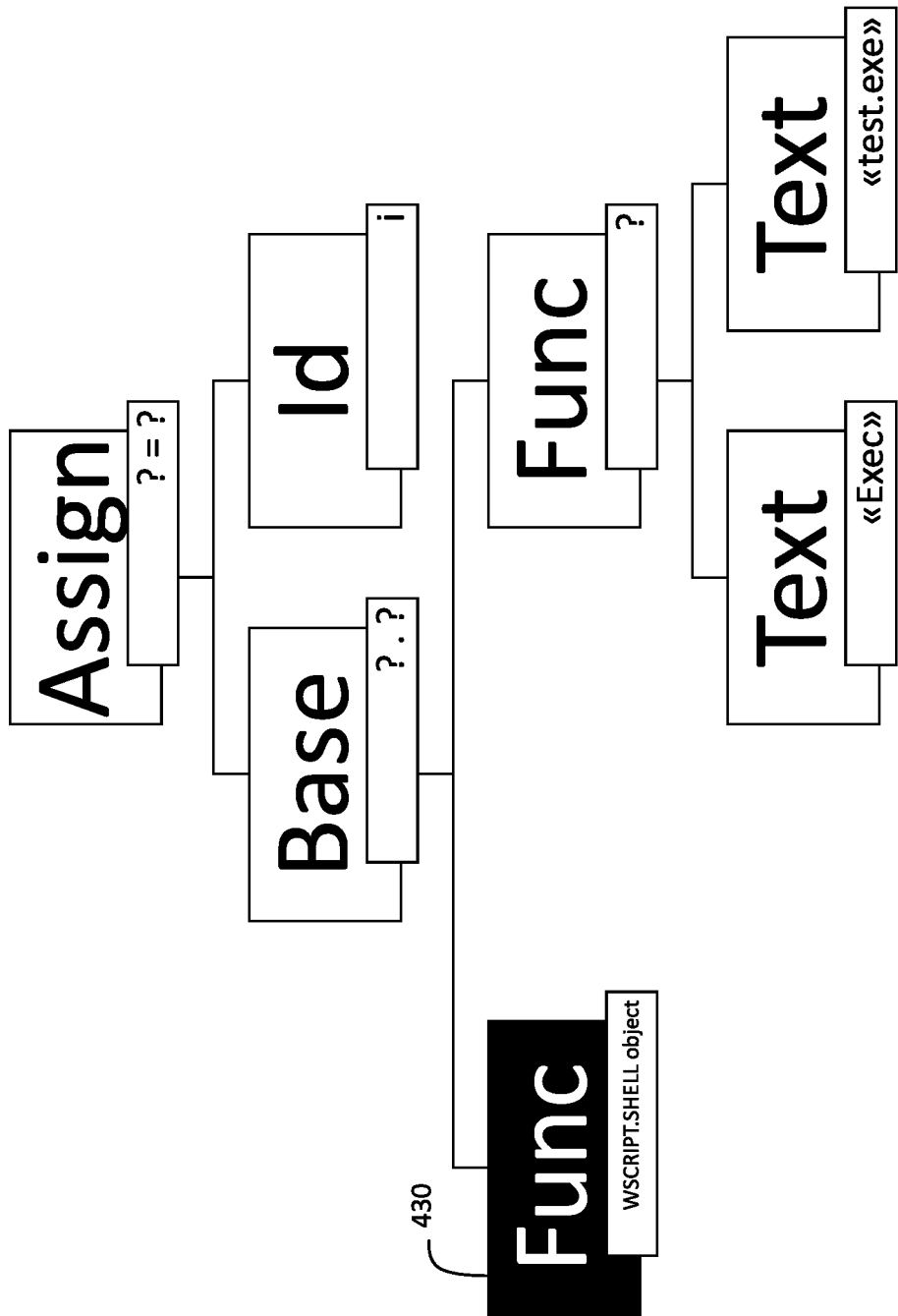
FIG. 4d is a block diagram illustrating a third step of execution of the second mAST.
Figure 4E:
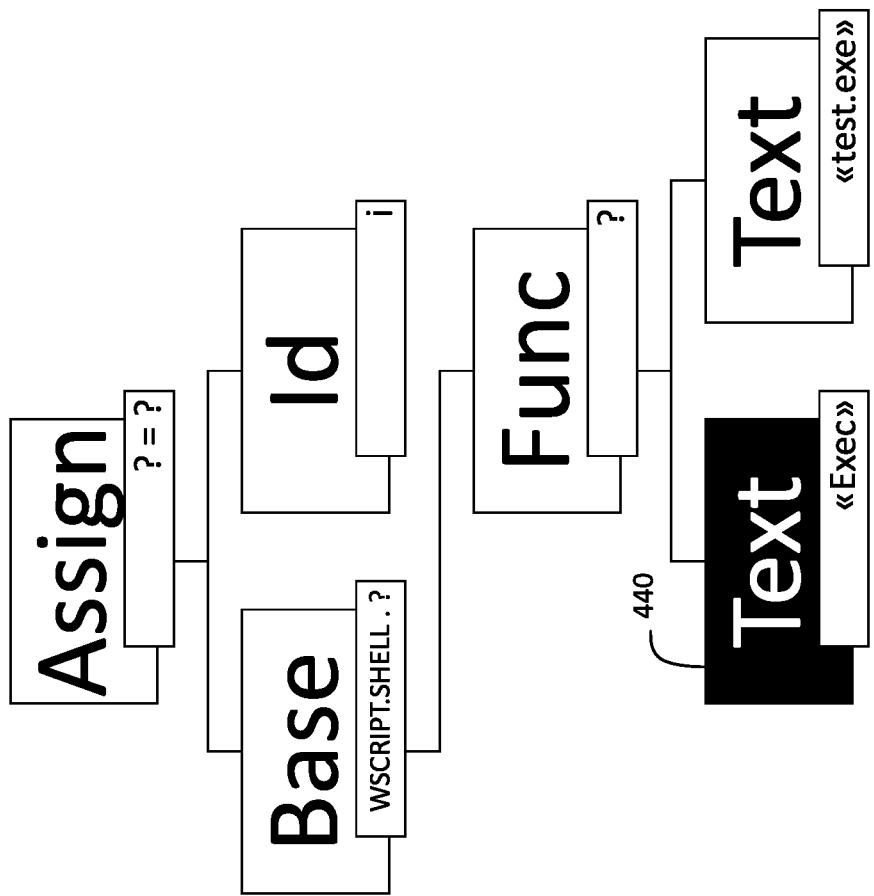
FIG. 4e is a block diagram illustrating a fourth step of execution of the second mAST.
Figure 4F:
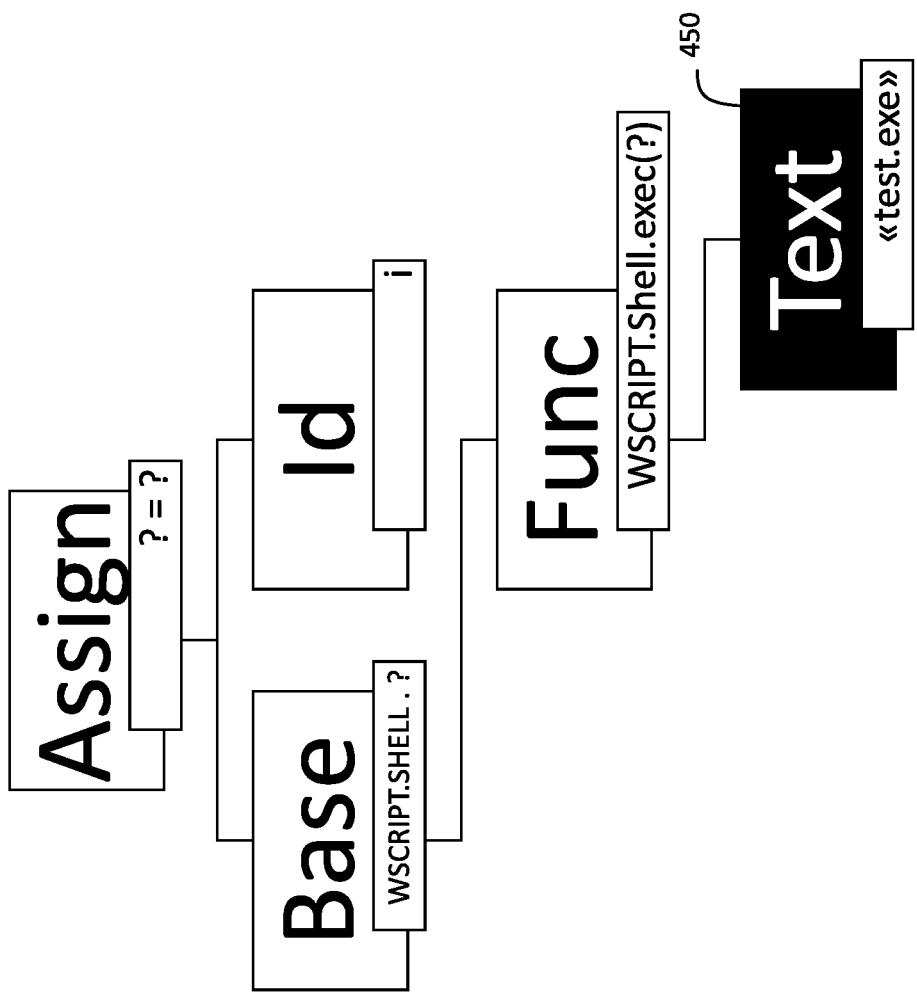
FIG. 4f is a block diagram illustrating a fifth step of execution of the second mAST.
Figure 4G:
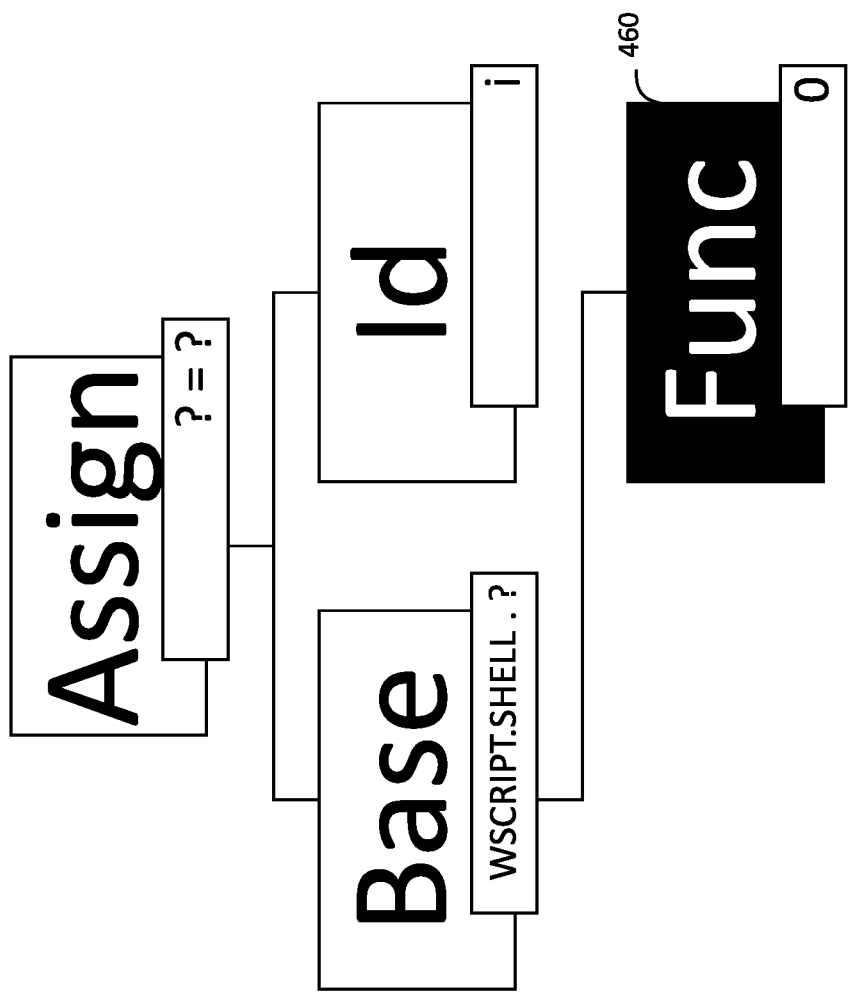
FIG. 4g is a block diagram illustrating a sixth step of execution of the second mAST.
Figure 4H:
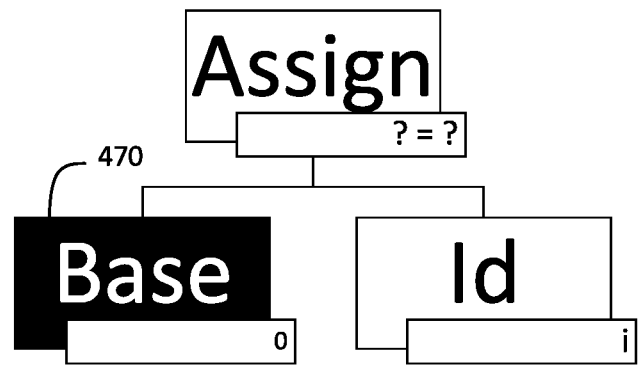
FIG. 4h is a block diagram illustrating a seventh step of execution of the second mAST.
Figure 4I:
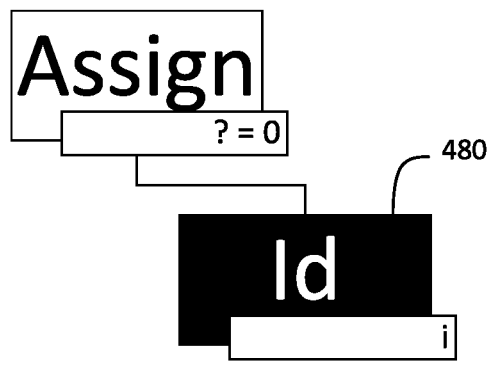
FIG. 4i is a block diagram illustrating an eighth step of execution of the second mAST.
Figure 4J:
FIG. 4j is a block diagram illustrating a ninth step of execution of the second mAST.

FIG. 4a is a block diagram illustrating an example of mAST 400 of a second line of code (i.e., i=CreateObject ("WScript.Shell").Exec("test.exe")). The line executes the file "test.exe" by first creating an object "WScript.Shell." This object's method run will be called with the parameter "test.exe," and hence test.exe is executed. FIGS. 4b-4j showcase the execution of various steps in the first mAST. For example, in FIG. 4b, universal emulator 108 executes the step 410 (i.e., Text <<CreateObject>>), which involves identifying the first portion of text in a function. In FIG. 4c, universal emulator 108 executes the step 420 (i.e., Text <<Wscript.Shell>>), introducing the second portion of text in the function. In FIG. 4d, universal emulator 108 executes the step 430 (i.e., Func Wscript.Shell object). In FIG. 4e, universal emulator 108 executes the step 440 (i.e., Text <<Exec>>), identifies Exec is a text in a function. In FIG. 4f, universal emulator 108 executes the step 450 (i.e., Text <<test.exe>>), which identifies test.exe as a text of the function. In FIG. 4g, universal emulator 108 executes the step 460 (i.e., Func 0). In FIG. 4h, universal emulator 108 executes the step 470 (i.e., Base 0). In FIG. 4i, universal emulator 108 executes the step 480 (i.e., Id i). In FIG. 4j, universal emulator 108 executes the step 490 (i.e., Assign i=0).

Figure 5:
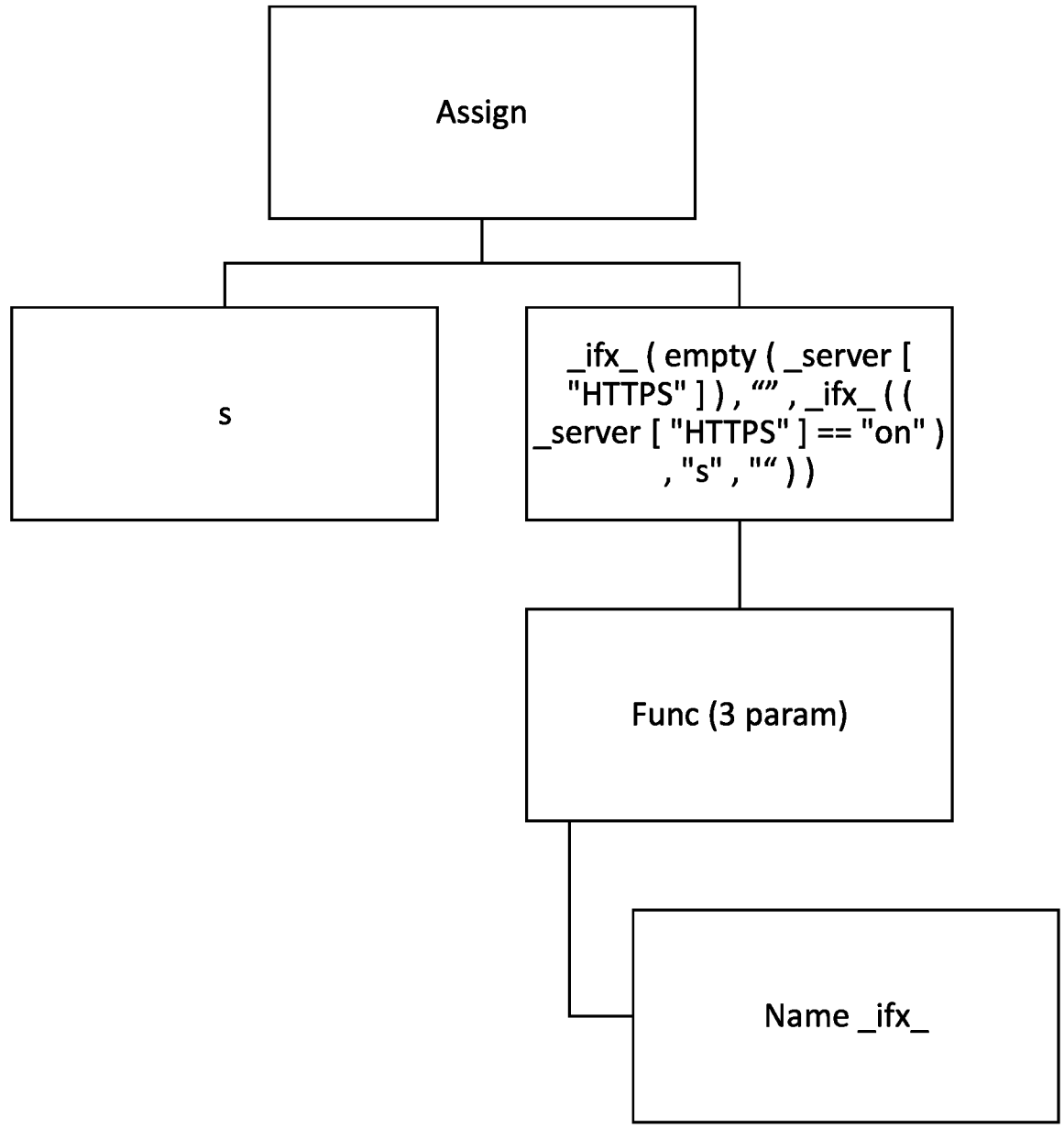
FIG. 5 is a block diagram illustrating a high-level example of a third modified abstract syntax tree (mAST) of a third line of code.

FIG. 5 is a block diagram illustrating a high-level example of a third mAST 500 of a third line of code. The same flow described in FIGS. 3 and 4 applies here. However, mAST 500 shows a token rewrite. To start with, the line:

s=empty (_server ["HTTPS"])?" ":(_server ["HTTPS"] =="on")?"s":" "

is too complicated for the mAST to be generated because of the conditional statement "?" and ":" (and in this case there are two of them). The line is changed to become more generic so the mAST generation component 106 can generate APIs of the action and create a correct tree for emulation.

For example, language module 104 may first identify the "?" and the ":" and their location in the line:

s=empty (_server ["HTTPS"])?" ":(_server ["HTTPS"]=="on")?"s": " "

Language module 104 may then replace these operators with "," to make it more API like:

s=empty (_server ["HTTPS"]), " ", (_server ["HTTPS"]=="on"), "s", " "

Language module 104 then adds the first API:

s=_ifx_(empty (_server ["HTTPS"]), " ", (_server ["HTTPS"]=="on"), "s", " ")

Language module 104 then adds the second API:

s=_ifx_(empty (_server ["HTTPS"]), " ", _ifx_((_server ["HTTPS"]=="on"), "s", " "))

This results in a line that mAST generation component 106 can understand. In this case, the "assign" would be the root-node, as in the first example.

Figure 6:
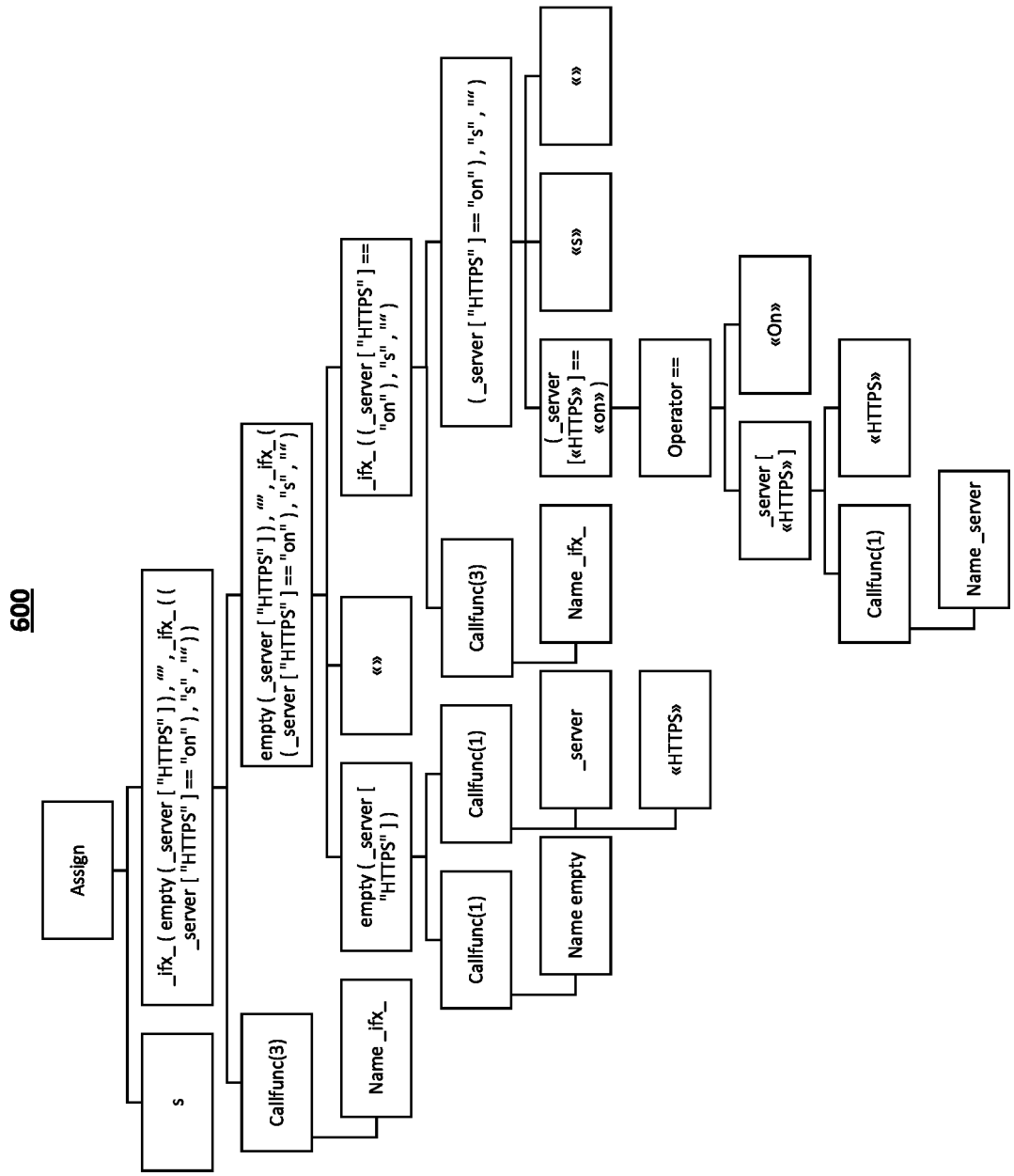
FIG. 6 is a block diagram illustrating a detailed example of a third modified abstract syntax tree (mAST) of a third line of code.

FIG. 6 is a block diagram illustrating a detailed example of a third mAST 600 of the third line of code. Like the first example in FIG. 3, anti-malware component 102 splits the line left and right from the assign. As long as there is no atomic result, anti-malware component 102 keeps on doing the process until each node is at an atomic element. Below is a table-driven version of mAST 600:

---

PtgStr : HTTPS
PtgName : _server
PtgFunc : P(1) : I(0)
PtgName : empty
PtgFunc : P(1) : I(0)
PtgStr :
  PtgStr : on
  PtgStr : HTTPS
  PtgName : _server
  PtgFunc : P(1) : I(0)
PtgPtEq : ==
PtgStr : s
PtgStr :
PtgName : _ifx_
PtgFunc : P(3) : I(0)
PtgName : _ifx_
PtgFunc : P(3) : I(0)
PtgName : s
PtgAssign : =

---

Universal emulator 108 starts to read from the end (i.e., the PtEq operator). PtEq needs two parameters, the destination(s) and the content to set "s" to. Universal emulator 108 first pops the value s and sets it as an identifier. Universal emulator 108 then pops the value, and in doing this-sets of a chain reaction.

First, the PtgFunc handler will run, which will fetch the function name first (_ifx_). Universal emulator 108 determines from the definition that there are 3 parameters. Universal emulator 108 will then fetch the $3^{rd}$ parameter first, and in this case—this is another function call also to _ifx_. This function call will then pop the empty parameter as its $3^{rd}$ parameter, the "s" as the second, and the "PtEq" as the condition. PtEq again needs to datapoints to compare, so it will pop the two values it needs. In this case, the second value is a function call to server ["https"] and the first value is the string "on." When all these run, the result is the value for the $3^{rd}$ parameter of the initial _ifx_—the false condition.

The true condition of the first _ifx_ is just an empty string " ", while the condition of is a function call to empty with one parameter server ["https"].

Universal emulator 108, when provided this mAST tree, will perform the following logical operations in this order:
API: "on"=_server("https")
API: false=empty ("on")
API: "on"=_server("https")
COMPARE: "on"=="on"
API: "s"=_ifx(true, "s", [none])
API: "s"=_ifx(false, [none], "s")
ASSIGN: s="s"

It should be noted that each handler has no knowledge of who their parent is or what their children are. They just pop the value they need to perform their operation (e.g., add, sub, mul, function call, etc), and the tree will collapse with the value requested.

Figure 7:
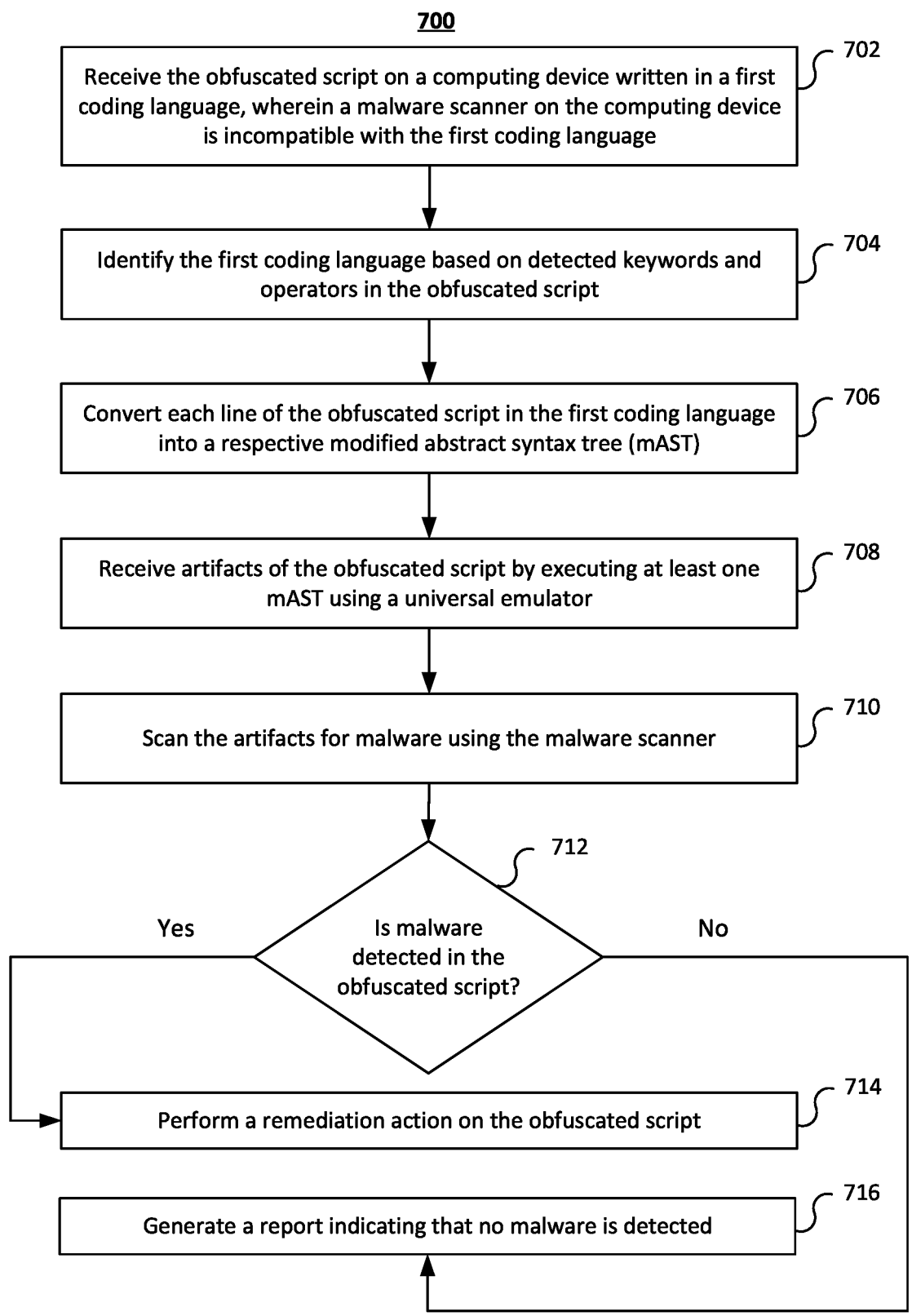
FIG. 7 illustrates a flow diagram of a method for detecting malware in obfuscated scripts.

FIG. 7 illustrates a flow diagram of method 700 for detecting malware in obfuscated scripts. At 702, anti-malware component 102 receives the obfuscated script (e.g., script 112) on a computing device (e.g., computer system 20) written in a first coding language (e.g., PHP), wherein a malware scanner (e.g., malware analysis module 110) on the computing device is incompatible with the first coding language.

At 704, anti-malware component 102 identifies the first coding language based on detected keywords and operators in the obfuscated script.

At 706, anti-malware component 102 converts each line of the obfuscated script in the first coding language into a respective mAST. In some aspects, converting further includes performing tokenization, multi-line rewrites, and token rewrites. In some aspects, converting further includes mapping flows in the obfuscated script.

At 708, anti-malware component 102 receives artifacts (e.g., artifact 114) of the obfuscated script by executing at least one mAST using a universal emulator 108.

At 710, anti-malware component 102 scans the artifacts for malware using the malware scanner.

At 712, anti-malware component 102 determines whether malware is detected in the obfuscated script based on the scanning. If malware is detected, method 700 advances to 714, where anti-malware component 102 performs a remediation action on the obfuscated script. In some aspects, the remediation action includes one of quarantining the obfuscated script and/or the artifacts, removing the obfuscated script and/or the artifacts from the computing device, and performing a recovery process on the computing device.

However, if no malware is detected, method 700 may advance to 716, where anti-malware component 102 generates a report indicating that no malware is detected. In some aspects, the results of the scan may be included in the report and presented to the user via a graphical user interface of anti-malware component 102 on the computing device.

In some aspects, the artifacts include another script written in a second coding language incompatible with the malware scanner. Anti-malware component 102 identifies the second coding language (e.g., JavaScript) based on detected keywords and operators in the another script. Anti-malware component 102 converts each line of the another script in the second coding language into another respective mAST. Anti-malware component 102 receives additional artifacts of the another script by executing at least one of the another respective mAST using the universal emulator. Anti-malware component 102 scans the additional artifacts for malware using the malware scanner. In response to detecting the malware in the another script based on the scanning, anti-malware component 102 performs the remediation action on the another script.

In some aspects, the universal emulator 108 is configured to execute an operation of the at least one mAST to generate a given artifact, and wherein anti-malware component 102 is configured to scan the given artifact.

Figure 8:
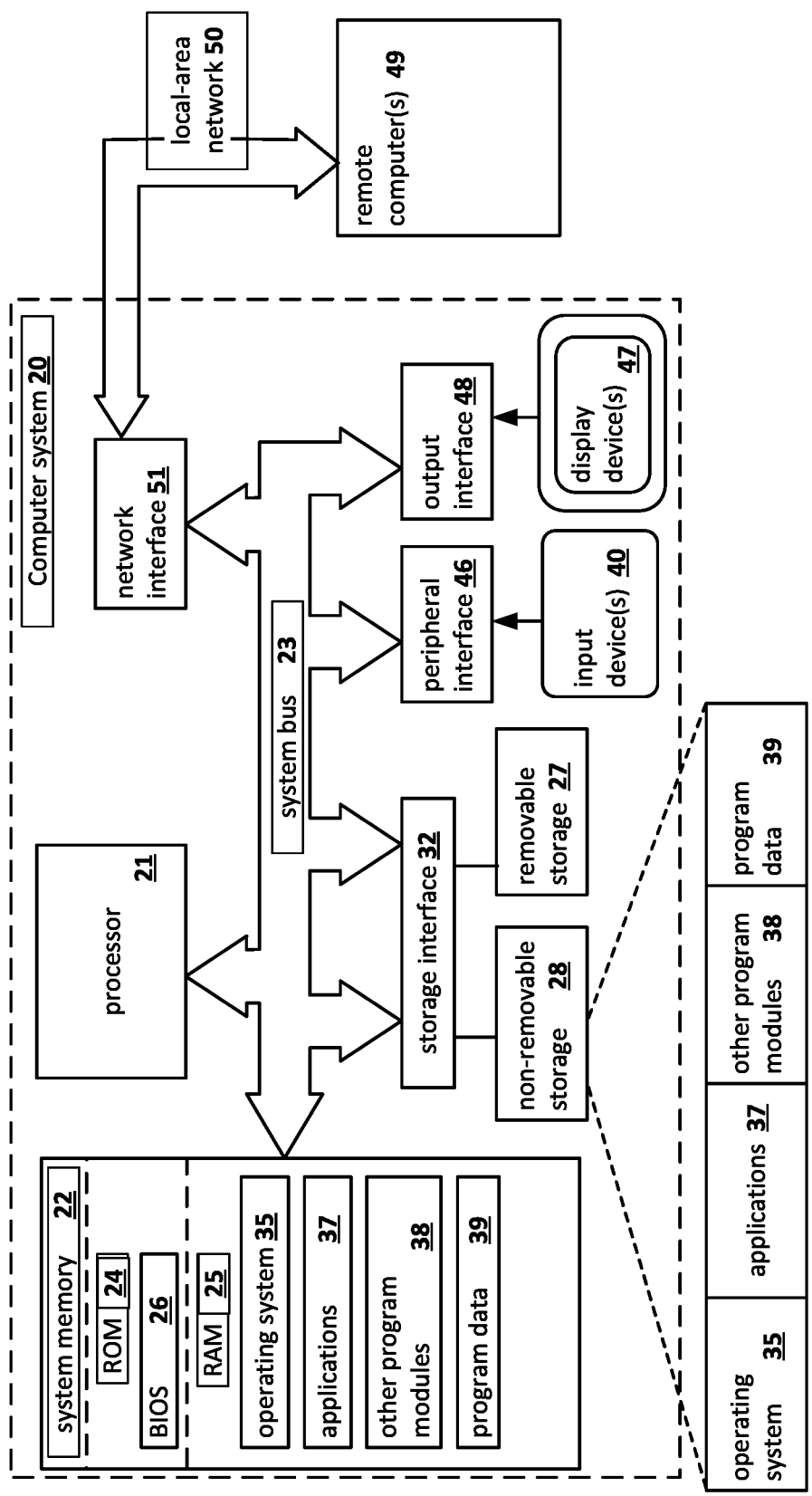
FIG. 8 presents an example of a general-purpose computer system on which aspects of the present disclosure can be implemented.

FIG. 8 is a block diagram illustrating a computer system 20 on which aspects of systems and methods for detecting malware in obfuscated scripts may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-7 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detecting malware in an obfuscated script, the method comprising:
receiving the obfuscated script on a computing device written in a first coding language, wherein a malware scanner on the computing device is incompatible with the first coding language;
identifying the first coding language based on detected keywords and operators in the obfuscated script;
converting each line of the obfuscated script in the first coding language into a respective modified abstract syntax tree (mAST);
receiving artifacts of the obfuscated script by executing at least one mAST using a universal emulator;
scanning the artifacts for malware using the malware scanner; and
in response to detecting the malware in the obfuscated script based on the scanning the artifacts, performing a remediation action on the obfuscated script.

2. The method of claim 1, wherein the converting further comprises performing tokenization, multi-line rewrites, and token rewrites.

3. The method of claim 1, wherein the converting further comprises mapping flows in the obfuscated script.

4. The method of claim 1, wherein the remediation action comprises one of quarantining the obfuscated script and/or the artifacts, removing the obfuscated script and/or the artifacts from the computing device, and performing a recovery process on the computing device.

5. The method of claim 1, wherein the artifacts comprise another script written in a second coding language incompatible with the malware scanner, further comprising:
identifying the second coding language based on detected keywords and operators in the another script;
converting each line of the another script in the second coding language into another respective mAST;
receiving additional artifacts of the another script by executing at least one of the another respective mAST using the universal emulator;
scanning the additional artifacts for malware using the malware scanner; and
in response to detecting the malware in the another script based on the scanning the additional artifacts, performing the remediation action on the another script.

6. The method of claim 1, wherein the universal emulator is configured to execute an operation of the at least one mAST to generate a given artifact, and wherein the malware scanner is configured to scan the given artifact.

7. A system for detecting malware in an obfuscated script, comprising:
at least one memory;
at least one hardware processor coupled with the at least one memory and configured, individually or in combination, to:
receive the obfuscated script on a computing device written in a first coding language, wherein a malware scanner on the computing device is incompatible with the first coding language;
identify the first coding language based on detected keywords and operators in the obfuscated script;
convert each line of the obfuscated script in the first coding language into a respective modified abstract syntax tree (mAST);

receive artifacts of the obfuscated script by executing at least one mAST using a universal emulator;

scan the artifacts for malware using the malware scanner; and in response to detecting the malware in the obfuscated script based on the scanning the artifacts, perform a remediation action on the obfuscated script.

8. The system of claim 7, wherein the at least one hardware processor is configured to convert by performing tokenization, multi-line rewrites, and token rewrites.

9. The system of claim 7, wherein the at least one hardware processor is configured to convert by mapping flows in the obfuscated script.

10. The system of claim 7, wherein the remediation action comprises one of quarantining the obfuscated script and/or the artifacts, removing the obfuscated script and/or the artifacts from the computing device, and performing a recovery process on the computing device.

11. The system of claim 7, wherein the artifacts comprise another script written in a second coding language incompatible with the malware scanner, wherein the at least one hardware processor is configured to:

identify the second coding language based on detected keywords and operators in the another script;

convert each line of the another script in the second coding language into another respective mAST;

receive additional artifacts of the another script by executing at least one of the another respective mAST using the universal emulator;

scan the additional artifacts for malware using the malware scanner; and in response to detecting the malware in the another script based on the scanning the additional artifacts, perform the remediation action on the another script.

12. The system of claim 7, wherein the universal emulator is configured to execute an operation of the at least one mAST to generate a given artifact, and wherein the malware scanner is configured to scan the given artifact.

13. A non-transitory computer readable medium storing thereon computer executable instructions for detecting malware in an obfuscated script, including instructions for:

receiving the obfuscated script on a computing device written in a first coding language, wherein a malware scanner on the computing device is incompatible with the first coding language;

identifying the first coding language based on detected keywords and operators in the obfuscated script;

converting each line of the obfuscated script in the first coding language into a respective modified abstract syntax tree (mAST);

receiving artifacts of the obfuscated script by executing at least one mAST using a universal emulator;

scanning the artifacts for malware using the malware scanner; and in response to detecting the malware in the obfuscated script based on the scanning the artifacts, performing a remediation action on the obfuscated script.

14. The non-transitory computer readable medium of claim 13, wherein the instruction for converting further comprises instructions for performing tokenization, multi-line rewrites, and token rewrites.

15. The non-transitory computer readable medium of claim 13, wherein the instruction for converting further comprises instructions for mapping flows in the obfuscated script.

16. The non-transitory computer readable medium of claim 13, wherein the remediation action comprises one of quarantining the obfuscated script and/or the artifacts, removing the obfuscated script and/or the artifacts from the computing device, and performing a recovery process on the computing device.

17. The non-transitory computer readable medium of claim 13, wherein the artifacts comprise another script written in a second coding language incompatible with the malware scanner, further comprising instructions for:

identifying the second coding language based on detected keywords and operators in the another script;

converting each line of the another script in the second coding language into another respective mAST;

receiving additional artifacts of the another script by executing at least one of the another respective mAST using the universal emulator;

scanning the additional artifacts for malware using the malware scanner; and in response to detecting the malware in the another script based on the scanning the additional artifacts, performing the remediation action on the another script.

18. The non-transitory computer readable medium of claim 13, wherein the universal emulator is configured to execute an operation of the at least one mAST to generate a given artifact, and wherein the malware scanner is configured to scan the given artifact.

* * * * *